United States Patent [19]

Goodman

[11] 4,411,224
[45] Oct. 25, 1983

[54] FLUID INJECTION SYSTEM FOR A TURBOCHARGED INTERNAL COMBUSTION ENGINE

[75] Inventor: Toronta P. Goodman, Summit Point, W. Va.

[73] Assignee: The Goodman System Company, Inc., New York, N.Y.

[21] Appl. No.: 305,263

[22] Filed: Sep. 24, 1981

[51] Int. Cl.³ .................. F02D 19/00; F02M 25/04
[52] U.S. Cl. ......................... 123/25 A; 123/25 J; 123/25 L; 60/599
[58] Field of Search .............. 123/25 R, 25 A, 25 E, 123/25 J, 25 M, 25 N, 25 L; 60/599; 261/18 A

[56] References Cited

U.S. PATENT DOCUMENTS

| | | | |
|---|---|---|---|
| 2,447,793 | 8/1948 | Bolt et al. ........................ | 123/25 E |
| 2,453,653 | 11/1948 | Alexanderson ................... | 123/25 J |
| 2,922,408 | 1/1960 | Humphries ....................... | 123/25 A |
| 3,196,606 | 7/1965 | Cholvin et al. ................... | 123/25 J |
| 3,224,186 | 12/1965 | Wood ................................ | 123/25 J |
| 3,930,470 | 1/1976 | Douglas ........................... | 123/25 A |
| 3,987,774 | 10/1976 | Waag ................................ | 123/25 J |
| 4,016,837 | 4/1977 | Wentworth, Jr. ................ | 123/25 R |
| 4,051,815 | 10/1977 | Coberley .......................... | 123/25 A |
| 4,141,323 | 2/1979 | Hart .................................. | 123/25 B |
| 4,185,595 | 1/1980 | Muhlberg ......................... | 123/25 A |
| 4,191,134 | 3/1980 | Goodman ......................... | 123/25 J |

Primary Examiner—Ira S. Lazarus

[57] ABSTRACT

A fluid injection system for a turbocharged internal combustion engine such as a spark-ignition engine in which an injection nozzle injects a finely divided spray of fluid, such as water or a water solution, into the engine in response to a flow of atomizing air. The nozzle is connected to a fluid supply reservoir and to the outlet line of a compressor which receives the air/fuel mixture from the carburetor and supplies the mixture to the nozzle to induce the flow of fluid through the nozzle. The compressor is driven by the flow of exhaust gases from the exhaust manifold so that the flow of atomizing air to the nozzle, and therefore the rate of fluid injection, is varied in response to variations in engine load.

11 Claims, 4 Drawing Figures

FLUID INJECTION SYSTEM FOR A TURBOCHARGED INTERNAL COMBUSTION ENGINE

BACKGROUND OF THE INVENTION

The present invention relates to a system for injecting a fluid, such as water or a water solution, into a turbocharged internal combustion engine.

Various cooling fluids, such as water and water in solution with other substances, such as methanol or alcohol, have been commonly injected into hydrocarbon engines, both of the spark-ignition and compression-ignition type, to provide improved engine operation. These improvements are possible since, during the compression stroke of the engine, the water droplets evaporate and thus absorb heat and prevent pre-ignition. On the power stroke the gasoline is burned and the remaining water is turned to steam which absorbs more heat and helps prevent detonation and the formation of nitrous oxides. Also, as the water turns to steam, it undergoes considerable expansion which produces significant additional power. Further, as a result of the above, combustion occurs at lower temperatures and is more even, and the pistons and valves enjoy a longer life. Further, the presence of water also creates a "steam cleaning" process that tends to remove carbon and other deposits from the combustion chamber, as well as prevent the formation of additional deposits.

Various types of prior devices have been used to introduce cooling fluids into internal combustion engines. These devices have included nozzle-type injectors in which the fluid is pumped directly into the engine and intake air humidifiers in which air is passed through a volume of water before being introduced into the engine. However, since the injection of a relatively low volume of fluid is desired when compared to the volume of fuel introduced into the engine, it is difficult, if not impossible, to meter the fluid with the precision needed to insure optimum performance when it is pumped directly into the engine. Also, if humidified air is used, there is a reduction in power and fuel economy since the humidified air is less dense than dry air with water droplets. Also, the use of humidified air does not permit the cooling effect caused by the evaporation of the water droplets.

The use of turbocharged engines has further highlighted the advantages of injecting cooling fluids into the engine since, for example, the high volume of air being processed in a turbocharged engine increases the temperature and therefore increases the possibility of detonation in the engine. However, the aforementioned prior art technique of pumping a stream of unatomized water directly into the carburetor, and therefore into the turbocharger, is unsatisfactory since the relatively heavy unatomized water impinges on the impeller blades and causes corrosion and premature failure of the blades.

SUMMARY OF THE INVENTION

It is therefore an object of the present invention to provide a system for injecting a fluid, such as water or a water solution, into the air intake side of a turbocharged internal combustion engine in response to the flow of exhaust gases to obtain a precise metering of the injected fluid.

It is still another object of the present invention to provide a fluid injection system of the above type in which the turbocharger pressurizes the air/fuel mixture in response to the flow of the exhaust gases before the mixture is introduced into the engine.

It is still another object of the present invention to provide a fluid injection system of the above type in which a portion of the air/fuel mixture from the turbocharger is introduced to a nozzle which injects the fluid into the engine in proportion to the flow of the air/fuel mixture.

It is another object of the present invention to provide a fluid injection system of the above type in which the fluid is injected in response to engine load.

It is still another object of the present invention to provide a fluid injection system of the above type which is inexpensive to manufacture and which is simple and reliable in operation.

It is a further object of the present invention to provide a fluid injection system of the above type which is easy to install on a turbocharged internal combustion engine and which is suited for aftermarket installations on previously manufactured engines.

BRIEF DESCRIPTION OF THE DRAWINGS

The above brief description as well as further objects, features and advantages of the present invention will be more fully appreciated by reference to the following detailed description of presently preferred by nonetheless illustrative embodiments in accordance with the present invention, when taken in conjunction with the accompanying drawings wherein.

DESCRIPTION OF THE PREFERRED EMBODIMENT

Figure 1:
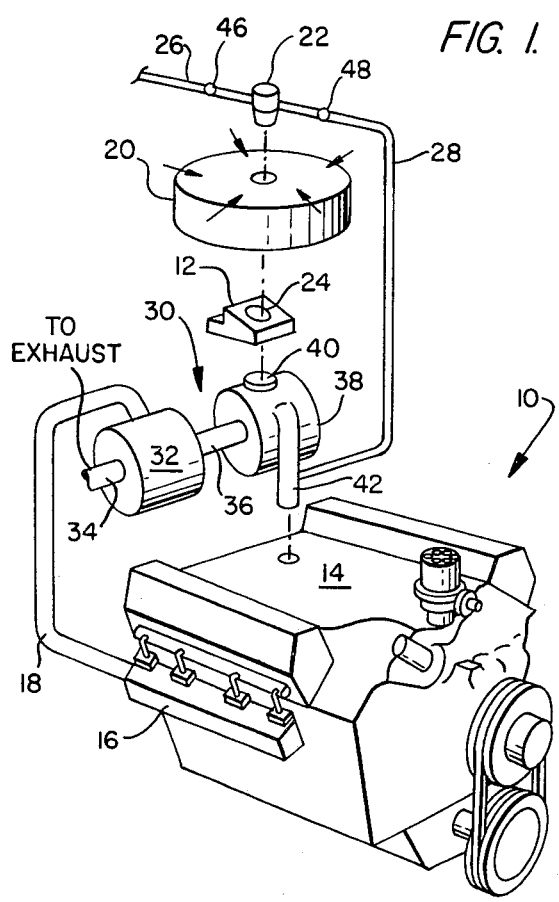
FIG. 1 is an exploded perspective view of an exemplary turbocharged internal combustion engine equipped with the system of the present invention, with certain components being shown schematically and with selected parts of the engine being omitted in the interest of clarity.

An exemplary turbocharged internal combustion engine incorporating the fluid injection system of the present invention is shown in FIG. 1 and is generally referred to by the reference in numeral 10. The engine 10 is of conventional design and includes a carburetor 12 which is mounted above an intake manifold 14 for introducing a fuel/air charge into the combustion chambers of the engine. An exhaust manifold 16 is provided on each side of the engine for receiving and directing the exhaust gases produced during the combustion process to a conduit 18. An air cleaner, or other plenum, 20 is mounted over the carburetor 12 and has an opening formed therein for receiving a fluid injection jet, or nozzle, 22 which is adapted to inject fluid, such as water or a water solution, into the intake air side of the engine 10. In the preferred embodiment, the nozzle 22 is mounted in the air cleaner 20 above an inlet opening 24 of the carburetor 12 to direct a downwardly diverging flow of finely divided fluid droplets into the intake air entering the opening 24 as shown by the flow arrows, and as will be described. It is understood that a source of fuel is connected to the carburetor 12 in a conventional manner, and is not shown in the interest of clarity.

The nozzle 22 is connected to the source of fluid through a hose 26 in a manner also to be described, and is also connected, via a hose 28, to the outlet of a turbocharger, shown in general by the reference numeral 30.

The turobcharger 30 includes an exhaust turbine 32 having an inlet connected to the conduit 18 for receiving exhaust gases from the exhaust manifold 16, it being understood that a connection is also provided between the turbine 32 and the other exhaust manifold located on the other side of the engine, as viewed in FIG. 1. After passing through the turbine 32, the exhaust gases exit through an outlet conduit 34 which is connected to the exhaust system (not shown) of the vehicle. Although not shown in the drawings, it is understood that the turbine 32 includes a rotor having blades which are driven by the force of the exhaust gases passing through the turbine to drive a shaft 36 which extends from the turbine 32 to a compressor 38. The compressor 38 includes an impeller, or the like (not shown) which is driven by the shaft 36 under certain conditions to be described later, and which operates to draw the mixture of air and fuel from the carburetor 12 into the compressor via an inlet 40. The air/fuel mixture is pressurized in the compressor 38 and then discharged, via an outlet conduit 42, into the intake manifold 14. The turbocharger 30 thus operates to improve the volumetric efficiency of the engine and since this type of arrangement is well known in the art, it will not be described in any further detail.

The aforementioned hose 28 is connected to the outlet conduit 42 and thus taps off a position of the air/fuel mixture from the compressor 38 and introduces it to the nozzle 22. The amount of the air/fuel mixture that is tapped is very small (such as, for example, one tenth of one percent) when compared to the volume of the mixture passing through the conduit 42 and does not affect the basic operational parameters of the engine.

The air/fuel mixture from the outlet of the compressor 38 passing through the hose 28 to the nozzle 22 serves to induce the flow of fluid through the hose 26 and to the nozzle 22 for discharge into the carburetor 12 in a manner to be described. A pair of valves 46 and 48 are provided in hoses 26 and 28, respectively, to prevent any reverse flow of the fluid and the air/fuel mixture, respectively, from the nozzle 22.

Figure 2:
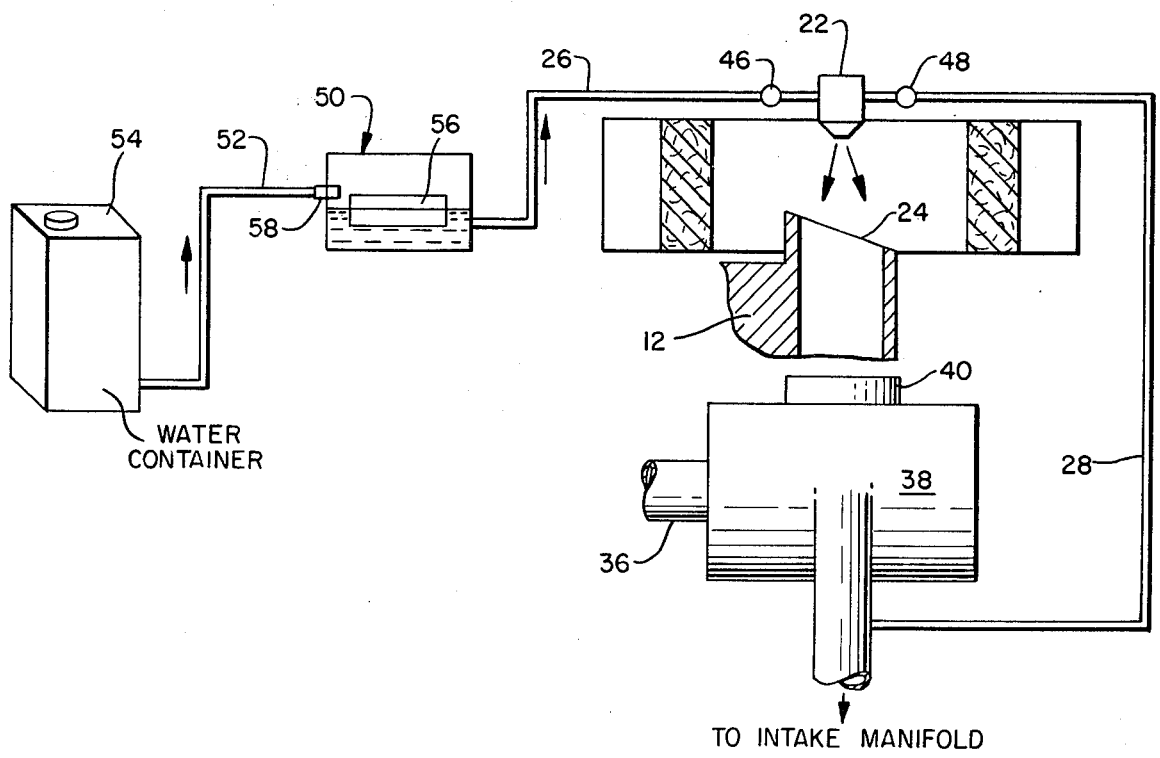
FIG. 2 is a schematic representation of a portion of the fluid injection system of FIG. 1.

As shown in FIG. 2, the hose 26 is connected to a float-bowl reservoir 50 which, in turn, is connected through a supply line 52 to a fluid container 54. The float-bowl reservoir 50 includes a float 56 that operates an inlet valve 58 which can be of cooling fluid within the reservoir 50 in a conventional manner. In the preferred embodiment, the fluid is in the form of water, or water solution with other substances, such as methanol, or other alcohols, and the container 54 is provided with a pump (not shown) for pumping the fluid to the reservoir 50. Also, the float 56 is located at a selected elevation below the elevation of the nozzle 22 to prevent the fluid from unintentionally flowing under the influence of gravity to and through the nozzle 22. The reservoir 50, while not necessary to the operation of the system of the present invention, permits the supply container 54 to be located remotely from the engine 10 at a convenient elevation relative to the nozzle 22.

Figure 3:
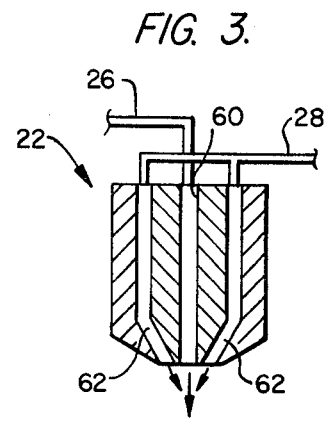
FIGS. 3 and 4 are cross-sectional views of two exemplary fluid injection nozzles suitable for use with the system of the present invention.
Figure 4:
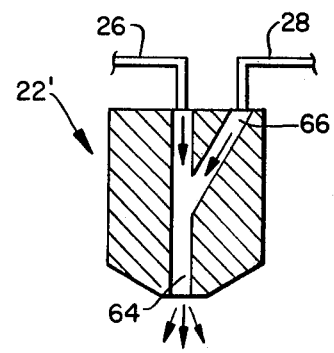

The nozzle 22 is adapted to provide a downwardly directed and preferably diverging flow of finely divided fluid droplets in response to the flow of air through the nozzle. While many different types of nozzles are suitable for use with the present invention, the nozzle 22 of the type shown in FIG. 3 is preferred which includes a central bore 60 for receiving the fluid from the hose 26 and a plurality of circumferentially arranged atomizing air supply bores 62 for receiving air from the hose 28 and for directing the flow of air to the outlet of the bore 60. The flow of air past the outlet of the bore 60 creates a low pressure zone which induces, or draws, fluid from the hose 26 through the bore 60 in a conventional manner, where it is mixed with, and atomized by, the air passing into the inlet 24 of the carburetor 12. In the alternative, a nozzle 22' of the type shown in FIG. 4 may be provided which has a central bore 64 connected to the fluid supply hose 26 and an air-injection bore 66 connected to the air supply hose 28 and registering with the central bore 64 at an acute angle to effect the induction and atomizing function.

In operation, upon starting the engine, the exhaust gases from the exhaust manifolds 16 will drive the turbine 32. The design is such that, when the speed of the shaft 36 exceeds a certain threshold value, the compressor 38 will be driven to draw in the air/fuel mixture from the carburetor 12 where it is pressurized and passed, via the conduit 42, to the intake manifold 14 in proportion to the flow of exhaust gases from the exhaust manifolds, via the conduit 18.

A portion of the air/fuel mixture flowing through the conduit 42 enters the hose 28 and is introduced to the nozzle 22 where it induces the flow of fluid such as water, from the hose 26, through the nozzle 22 and into the carburetor 12. Thus, the air/fuel mixture supplied to the nozzle 22, and the resulting injection of fluid into the carburetor 24, varies in response to the pressure of the air/fuel mixture in the conduit 42 and therefore the flow of exhaust gases from the exhaust manifold 16 which is a function of engine load.

Since the volume of the air/fuel mixture passing through the nozzle 22 is relatively high compared to the volume of the fluid, a very precise metering of the fluid is obtained.

It should be noted that the turbocharger 30 can be adapted to operate only at certain optimum times relative to the operation of the engine. For example, the turbine 32 can be designed to produce enough power to drive the compressor 38, and thus provide the compressed air/fuel mixture to the nozzle 22, only when there is an appreciable demand on the engine as manifested by the discharge of a predetermined volume of exhaust gases from the exhaust manifolds 16. As a result, the turbocharger 30 will not provide the air/fuel mixture to the nozzle 22, and the nozzle will therefore not inject the fluid, at inappropriate times, such as during startup, deceleration, etc. Also, a mechanism is provided for preventing unwanted operation of the turbocharger 30 during cold starts, especially in relatively cold weather, since the shaft 36 is normally located in a bath of oil which, in cold temperatures, has an increased viscosity which places a slight resistance on the output torque of the shaft and thus impairs the operation of the compressor 38 until the viscosity of the oil decreases from the heat of the engine.

As a result of the foregoing, the fluid injection system of the present invention operates only at times which are optimum as determined by the variations in engine load. This, plus the precise metering of the fluid that is achieved by the system of the present invention, can result in a dramatic increase in engine efficiency.

With the proper use of the system, pre-ignition, detonation, knock and ping are substantially eliminated since the fluid lowers the combustion temperatures below the point where they normally occur. Also, the production of nitrous oxides are reduced because of the lower operating temperatures. Further, the small fluid droplets produced by the system of the present invention are so minute so as to eliminate cool spots of unburned gas, and do not corrode, or otherwise cause damage, to the impeller blades of the turbine, as do other liquid fluid injection systems.

While the preferred embodiment of the fluid injection system of the present invention has been shown in combination with the engine illustrated in FIG. 1, as will be apparent to those skilled in the art, the fluid injection system can be applied to any one of a plurality of different types of engines including 4-cylinder, 6-cylinder, and V-8 engines. Also, the present invention is not limited to use with engines having a carburetor for mixing air and fuel but can easily be adapted to diesel, fuel injection, and stratified charge engines by directing the cooling fluid directly into the cylinder of the engine through an appropriate inlet. Also, although reference has been made to the terms "cooling fluid," "water," and "water in solution," it is understood that other types of fluids can be injected that affect the combustion process, such as octane improvers, anti-detonates, and oxygen additives, etc.

Still other variations in the foregoing can be made within the scope of the invention. For example, although reference is made to the use of conduit to connect the various components in fluid flow communication, it is understood that tubing, pipes, hoses, etc. can be used. Also, a demand regulator, or the like, can be provided in place of the float-bowl reservoir 100 to provide the fluid to the hose 26, and the position and location of the nozzle 22 can be varied as long as it is effective to introduce the fluid into the intake air side of the engine 10.

As also will be apparent from those skilled in the art, still other changes and modifications may be made to the water injection system of the present invention without departing from the spirit and scope of the invention and recited in the appended claims and their legal equivalent.

What is claimed is:

1. A system for injecting fluid into an internal combustion engine, said system comprising means for supplying an air/fuel mixture to said engine, means driven by the exhaust gases of said engine for receiving said mixture and pressurizing said mixture in proportion to the load on said engine, and flow passage means connected to a source of said fluid and to said pressurizing means for receiving said fluid and said mixture, said flow passage means being formed and arranged to draw said fluid from said source in response to the flow of said mixture and inject it into said supplying means at a rate proportional to the pressure of said mixture.

2. The system of claim 1 wherein said flow passage means comprises a fluid flow passage and at least one mixture flow passage, said passages being formed and arranged to mix said fluid and mixture upon their discharge from said flow passage means.

3. The system of claim 2 or 1 wherein said flow passage means is in the form of a nozzle.

4. The system of claim 1 wherein said pressurizing means comprises a turbocharger connected to the exhaust manifold of said engine for pressurizing said mixture in proportion to the flow of exhaust gases from said intake manifold.

5. The system of claim 4 wherein said turbocharger comprises a turbine for receiving said exhaust gases and driving an output shaft in proportion to the flow of said gases, and a compressor drivingly connected to said shaft for pressurizing said mixture.

6. The system of claim 5 wherein said turbine is adapted to drive said compressor only when the flow of exhaust gases exceeds a predetermined value.

7. The system of claim 5 further comprises means connecting the inlet of said turbine to the exhaust system of said engine.

8. The system of claim 5 further comprising conduit means connecting the outlet of said compressor to the intake manifold of said engine.

9. The system of claim 1 further comprising conduit means connecting said pressurizing means to said engine.

10. The system of claim 9 or 8 wherein said flow passage means receives a portion of said mixture from said conduit means.

11. The system of claim 10 further comprising means connected to said conduit means for tapping off a portion of said mixture and supplying said portion to said flow passage means.

* * * * *